(12) United States Patent
Krishna (10) Patent No.: US 8,150,876 B2
(45) Date of Patent: Apr. 3, 2012

(54) SIMPLIFYING DETERMINATION OF THE GROUPS TO WHICH USERS BELONG WHEN USING DYNAMIC GROUPS

(75) Inventor: Jai Krishna, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 518 days.

(21) Appl. No.: 12/369,732

(22) Filed: Feb. 11, 2009

(65) Prior Publication Data

US 2010/0205193 A1 Aug. 12, 2010

(51) Int. Cl.
*G06F 17/30* (2006.01)
(52) U.S. Cl. .................. 707/783; 707/694; 707/769
(58) Field of Classification Search .............. 707/694, 707/769, 783
See application file for complete search history.

(56) References Cited

U.S. PATENT DOCUMENTS

| | | | | |
|---|---|---|---|---|
| 6,671,695 B2 | 12/2003 | McFadden | | |
| 7,130,839 B2 | 10/2006 | Boreham et al. | | |
| 2004/0167926 A1* | 8/2004 | Waxman et al. | ........... | 707/104.1 |
| 2005/0038856 A1 | 2/2005 | Krishnasamy et al. | | |
| 2008/0016546 A1 | 1/2008 | Li et al. | | |
| 2008/0071862 A1 | 3/2008 | Burchard | | |
| 2008/0082540 A1* | 4/2008 | Weissman et al. | ............... | 707/9 |
| 2008/0263076 A1 | 10/2008 | Duffield et al. | | |
| 2008/0263207 A1 | 10/2008 | Popescu et al. | | |
| 2008/0288444 A1* | 11/2008 | Edwards et al. | .................. | 707/2 |
| 2009/0089316 A1* | 4/2009 | Kogan et al. | ................. | 707/102 |
| 2011/0113062 A1* | 5/2011 | Quinlan et al. | ............... | 707/770 |

OTHER PUBLICATIONS

"Mohan Rao Cavale", "Dynamic Groups in Windows Server 2003 Authorization Manager", "Microsoft Corporation", "http://msdn.microsoft.com/en-us/library/ms952382.aspx#azmandynamgrps_topic5" Dated: Jan. 2003, pp. 1-5.
"Haripriya S, Jaimon Jose, Jim Sermersheim", "How to Manage and Use Dynamic Groups in Novell Edirectory", "Novell, Inc.", "http://support.novell.com/techcenter/articles/ana20020405.html", Dated: Apr. 1, 2002, pp. 1-11.
"Dynamic Groups and Nested Group Support in IBM Websphere Application Server" http://publib.boulder.ibm.com/infocenter/wasinfo/index.jsp?topic=/com.ibm.websphere.express.doc/info/exp/ae/csec_dynamicnestedgroup.html, Dated: Sep. 10, 2008, pp. 1-2.
"Grouping Directory Data and Managing Attributes—Sun Java System Directory Server Enterprise Edition 6.2 Deployment Planning Guide", http://docs.sun.com/app/docs/doc/820-2488/aaldf?a=view, Copyright Date: 1994-2008, pp. 1-8.

* cited by examiner

*Primary Examiner* — John E Breene
*Assistant Examiner* — Dennis Myint
(74) *Attorney, Agent, or Firm* — Narendra Reddy Thappeta (57) ABSTRACT

A search tool provided according to an aspect of the present invention maintains a cache data indicating which users are members of which dynamic groups. When a membership request is received requesting a set of dynamic groups to which a user belongs, the search tool examines the cache data to determine the set of dynamic groups to which the user belongs and sends the determined groups as a response to the membership request. According to another aspect of the present invention, the search tool may store an include list and an exclude list, respectively indicating the users to be included and excluded from each dynamic group. The lists are inspected in forming the set of dynamic groups to which the user belongs.

21 Claims, 5 Drawing Sheets

| | UserName (321) | Job_Title (322) | Manager (323) | Location (324) |
|---|---|---|---|---|
| 351 → | King | President | — | Seattle |
| 352 → | Jones | Manager | King | Seattle |
| 353 → | Scott | Analyst | Jones | Seattle |
| 354 → | Ford | Analyst | Jones | London |
| 355 → | Mike | Programmer | Jones | London |
| 356 → | Happy | Manager | King | Bangalore |
| 357 → | Susan | Analyst | Happy | Bangalore |
| 358 → | Adam | Programmer | Happy | Bangalore |
| 359 → | Kelly | Programmer | Happy | Bangalore |

| | UserName (321) | Job_Title (322) | Manager (323) | Location (324) |
|---|---|---|---|---|
| 351 → | King | President | — | Seattle |
| 352 → | Jones | Manager | King | Seattle |
| 353 → | Scott | Analyst | Jones | Bangalore |
| 355 → | Mike | Programmer | Jones | London |
| 356 → | Happy | Manager | King | Bangalore |
| 357 → | Susan | Analyst | Happy | Bangalore |
| 358 → | Adam | Programmer | Happy | Bangalore |
| 359 → | Kelly | Programmer | Happy | Bangalore |
| 360 → | Betty | Programmer | Adam | Bangalore |

SIMPLIFYING DETERMINATION OF THE GROUPS TO WHICH USERS BELONG WHEN USING DYNAMIC GROUPS

BACKGROUND

1. Technical Field

The present disclosure relates to management of users and more specifically to simplifying determination of the groups to which users belong when using dynamic groups.

2. Related Art

A group refers to a set of users, treated as a single entity in the management of various tasks. For example, groups are often used to simplify specification of access controls of shared resources, to facilitate easier addressing when sending communications (e.g., email) to the users/members of a group, to facilitate co-operative work (e.g., software coding, work-flows), etc. Thus, each user of a group is said to be a member of that group. A user may be a member of (can belong to) multiple groups.

A dynamic group is a type of group in which the members are identified based on corresponding rule/criteria indicating the conditions to be satisfied by the user attributes (such as name, location, job title, etc.). The users whose values of the attributes satisfy the rule are determined to belong to the corresponding dynamic group. In sharp contrast, in static groups, the list of users/members belonging to each group is maintained manually by an administrator.

It is often required that the groups to which users belong be determined (a common operation along with determining the user that belong to a group). Such a determination may be performed efficiently with static groups by checking whether the user is contained in the member lists maintained by the administrator.

On the other hand, for dynamic groups, the determination of the groups to which a user belongs may necessitate that member lists corresponding to each of the dynamic groups be determined dynamically and then be checked as done with respect to static groups. Alternatively, the values of the user attributes may be checked against the rules corresponding to each of the dynamic groups. It may be appreciated that such determination may require considerable amount of time and/or resources, in particular, when the number of dynamic groups is large.

Accordingly, it may be desirable that the determination of the groups to which user belong be simplified (or made more efficient) even when using dynamic groups.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

According to an aspect of the present invention, a search tool maintains a cache data indicating which users are members of which dynamic groups. When a membership request is received requesting a set of dynamic groups to which a user belongs, the search tool examines the cache data to determine the set of dynamic groups to which the user belongs and sends the determined groups as a response to the membership request.

In one embodiment, the search tool maintains the cache data in the form of tables in a database server (supporting relational database technologies). Accordingly, the cache data is examined by forming and executing a structured query language (SQL) query designed to retrieve the set of dynamic groups corresponding to the user from the tables in the database server.

Thus, the determination of the dynamic groups to which users belong is simplified since the execution of a SQL query in general requires considerably less amounts of time and/or resources.

According to another aspect of the present invention, the search tool may store an include list and an exclude list, respectively indicating the users to be included and excluded from each dynamic group. The lists are inspected in forming the set of dynamic groups to which the user belongs.

Such a feature enables a user/administrator to manually specify the members belonging to a dynamic group, for example, when a user is required to be added (or removed) to/from a dynamic group even when the attribute values of the user does not satisfy (or satisfies) the rule defined for the dynamic group.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
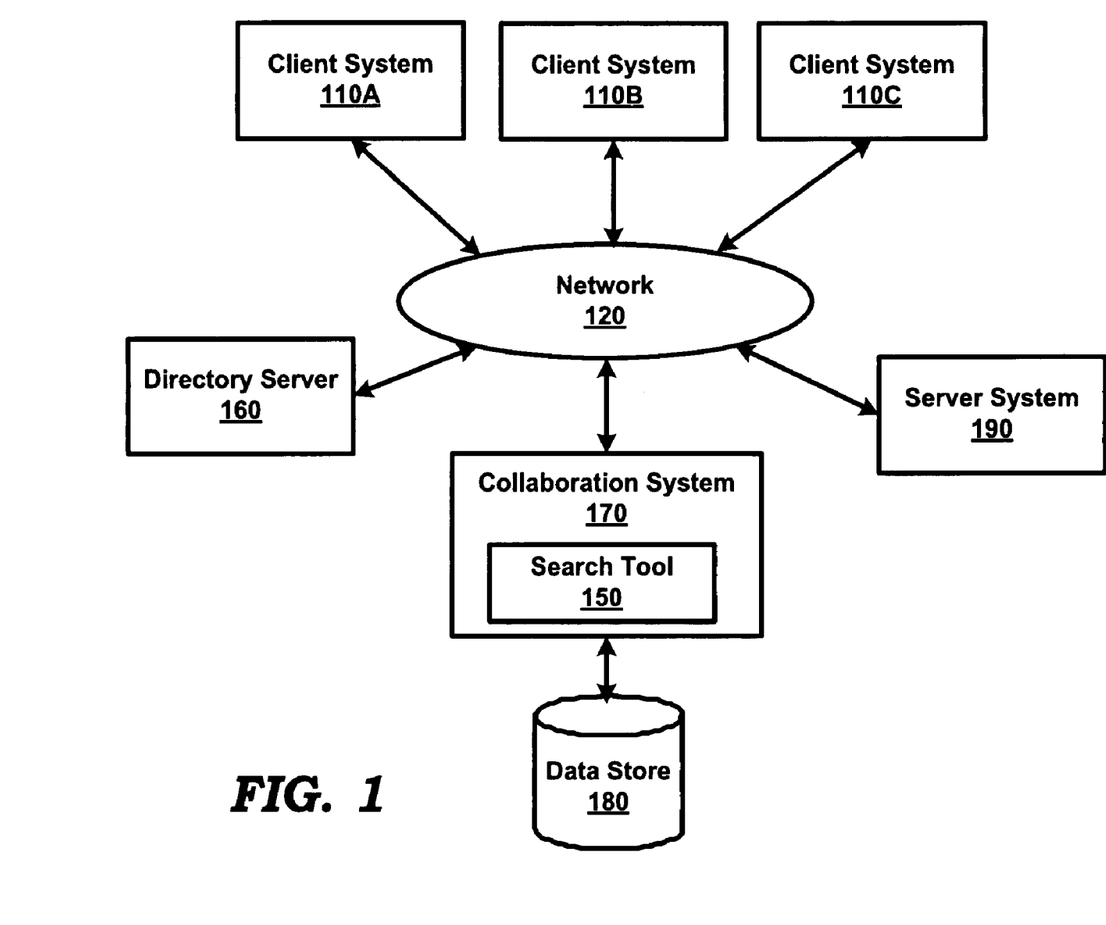
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110C, network 120, directory server 160, collaboration system 170 (containing search tool 150), data store 180 and server system 190. The different systems may be provided as part of a single enterprise.

Merely for illustration, only representative number/type of systems is shown in the Figure. Many environments often contain many more systems, both in number and type, depending on the purpose for which the environment is designed. Each system/device of FIG. 1 is described below in further detail.

Network 120 provides connectivity between client systems 110A-110C, directory server 160, collaboration system 170, and server system 190. Network 120 may be implemented using protocols such as Internet Protocol (IP) well known in the relevant arts. In general, in IP environments, an IP packet is used as a basic unit of transport with the source address being set to the IP address assigned to the source system from which the packet originates and the destination address set to the IP address of the target system to which the packet is to be eventually delivered.

Data store 180 represents a non-volatile storage facilitating storage and retrieval of a collection of data by one or more applications executing in collaboration system 150. Data store 180 may store information regarding the users and/or groups, the member lists corresponding to static groups, the definitions of dynamic groups, cache lists, etc.

In one embodiment, data store 180 is implemented using relational database technologies and therefore provides storage and retrieval of data using structured queries such as SQL (Structured Query Language). SQL refers to a special-purpose, generally non-procedural language (generally indicates what to retrieve based on conditions, in contrast to how to retrieve) that supports the definition, manipulation, and control of data in systems implementing relational database technologies.

Each of client systems 110A-110C represents a system such as a personal computer, workstation, mobile station, etc, used by users in the enterprise to generate (client) requests to business/enterprise applications executing in collaboration system 170 and/or server system 190. The requests may be generated using appropriate interfaces. In general, a client system requests an application for performing desired tasks and receives corresponding responses containing the results of performance of the requested tasks.

Each of collaboration system 170 and server system 190 represents a server (or several servers), such as a web/application server, which executes business/enterprise applications capable of processing client requests received from client systems 110A-110C. Each of collaboration system 170 and server system 190 may also contain other software programs such as operating system, device drivers, etc., (not shown) that provides a (common) run time environment facilitating the execution of the business/enterprise applications.

Server system 190 may execute enterprise applications that are related to users and/or groups of users such as a payroll application, customer resource management (CRM) application, human resource management (HRM) application, etc. Such enterprise applications typically require the details of the users and/or the groups to be maintained in a secondary storage, such as a database or file system. For example, a payroll application may require the salary/flexible benefit of each user/employee, business unit bonuses, department/group wise expenses/bonuses, etc. to be maintained.

Users/groups related information is often maintained by identity management servers/systems provided within an enterprise. An identity management server in general maintains the identity (details) of users and also the details of static and/or dynamic groups defined for the users. In one embodiment, the information related to users/groups (required for enterprise applications executing in server system 190) is maintained in directory server 160 (an identity management server).

Directory server 160 represents a non-volatile storage facilitating information related to an enterprise (such as users, dynamic/static groups, resources, organizational units, etc.) to be maintained in a logical/hierarchical manner by enterprise applications executing in server system 190 (and collaboration system 170). Directory server 160 facilitates dynamic groups to be defined in terms of corresponding rules (containing conditions to be satisfied by user attributes). The rules defining each group and a group identifier are stored in directory server 160, which may respond to membership requests based on such stored information. Directory server 160 may be implemented using protocols such as lightweight directory access protocol (LDAP) well known in the relevant arts.

Collaboration system 170 may execute collaborative/enterprise applications designed to perform group/collaborative activities. The collaborative applications may use users/groups as senders (users) and recipients (users/groups) of communication by way of email, voicemail, instant messaging applications/subsystems, as invitees to meetings and online voice/video conference applications/subsystems, as owners and participants of collaborative contexts such as workspaces, discussion forums, etc., as owners, viewers and reviewers of collaborative artifacts such as documents, images etc. and also in specifying authorization that allows/denies usage of specific system functions.

The collaborative applications may be designed to use the user/group related information maintained in an identity management server in the enterprise. In one embodiment described below where user/group information is maintained in directory server 160, collaborative applications (as well as search tool 150) executing in collaboration system 170 are designed to interact/communicate with directory server 160 for retrieving the user/group information of interest (related to either all the users/groups maintained in directory server or a subset of users/groups based on requirements/design of the collaborative applications).

However, the features of the present invention can be implemented in other environments as well, wherein the user/group information is maintained in one or more types/number of collaboration systems and/or identity management systems. For example, collaboration system 170 may be designed to maintain (in data store 180) user/group information independent of (or in addition to) directory server 160, with the collaborative applications designed to operate with such maintained data. Oracle Beehive System available from Oracle Corporation, the assignee of the subject patent application, is an example of a collaboration system which is designed to maintain and operate with user/group information independent of (or in addition to, for example by maintaining a copy) the identity management systems present in the enterprise.

Collaborative activities such as sharing of documents/resources among different users often necessitate access to such documents/resources to be controlled. Such access control is commonly specified in relation to groups of users (rather than for individual users). For example, a project detail document may be allowed access to only programmers, managers, and administrators (each of which may be defined as a corresponding dynamic group). Accordingly, when a user desires to access the project detail document, it may be necessary to determine the specific groups to which the user belongs in order to determine whether the user is allowed access to the document.

Search tool 150, provided according to various aspects of the present invention, simplifies the determination of the groups to which a user belongs when using dynamic groups as described below with examples. Search tool 150 may be implemented using appropriate combination of hardware, software and firmware.

Though search tool 150 is shown internal to collaboration system 170, it may be appreciated that in alternative embodiments, search tool 150 may be implemented as an external independent tool or internal to directory server 160 or server system 190. In general, search tool 150 needs to be implemented tightly coupled to the identity management system to ensure that several features of the present invention (e.g. updating cached lists) can be implemented in an atomic manner.

3. Determining the Groups to which a User Belongs

Figure 2:
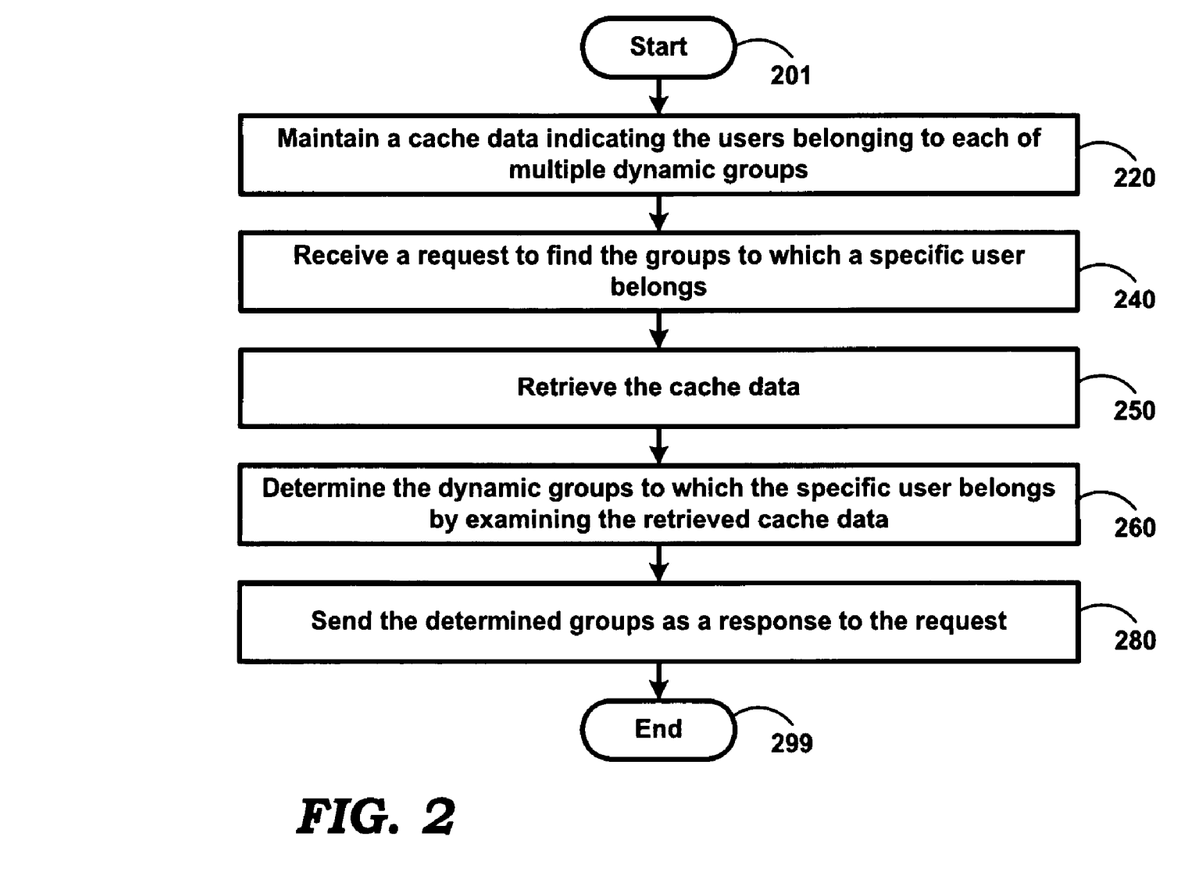
FIG. 2 is a flowchart illustrating the manner in which the determination of the groups to which a user belongs when using dynamic groups is simplified according to an aspect of the present invention.

FIG. 2 is a flowchart illustrating the manner in which the determination of the groups to which a user belongs when using dynamic groups is simplified according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, search tool 150 maintains a cache data indicating the users belonging to each of multiple dynamic groups (defined in an identity management server such as directory server 160). Such maintaining implies that the rules defining the membership of each dynamic group are evaluated (a priori, before step 240) and the cache data is generated/stored in a memory. The cache data is further updated to reflect changes in the user attributes and/or membership of the groups.

Accordingly, search tool 150 may be designed to monitor directory server 160 (or the identity management server maintaining user/group information) to determine when users and/or dynamic groups are being newly created/defined, updated and/or deleted. In one embodiment, directory server 160 is designed to provide notifications corresponding to creation, update and deletion of users/groups, with search tool 150 designed to capture (i.e., update cache data) such notifications.

Thus, on determining that a new dynamic group is created in directory server 160, search tool 150 determines the members belonging to the new group (the member list corresponding to the dynamic group), for example, by querying directory server 160 for the member list. The determined member list is then included in the cache data. Similarly, when a dynamic group is updated (by modifying the rule associated with group), the member list corresponding to the updated dynamic group is determined (again, by querying directory server 160) and included in the cache data. When a dynamic group is deleted, the corresponding member list maintained in the cache data may also be deleted.

Further, when a new user is determined to be created, the values of the user attributes of the new user are checked with the definitions/rules of the dynamic groups to determine the dynamic groups to which the new user belongs. The member lists of the determined dynamic groups contained in the cache data are then updated by adding the new user to the corresponding member lists. Similar operations of updating the member lists of the multiple dynamic groups contained in the cache data is performed when a user is determined to be updated (that is, the values of user attributes are changed) or deleted.

Thus, the cache data is updated to reflect the changes made in the user/group information. Though the updates to cache data are described as being performed by querying directory server 160, in alternative embodiments, the information related to users/groups of interest may be retrieved and maintained in a data store 180 as a local copy, with search tool 150 designed to update the cache data based on the local copy of the user/group information.

The cache data may be maintained in a volatile storage, such as a RAM in collaboration system 170. The cache data may also me maintained in data store 180 or a secondary storage in collaboration system 170.

In step 240, search tool 150 receives a (membership) request to find the groups to which a specific user belongs. The request may be received from a collaborative application (executing in collaboration system 170) in response to the specific user desiring to access a shared document (which may necessitate determination of the groups to which the specific users belongs as described above). Alternatively, such a request may be received directly from a user/administrator using one of client systems 110A-110C.

In step 250, search tool 150 retrieves the cache data (from data store 180 or a secondary storage in collaboration system 170). It should be noted that the retrieved cache data represents the updated cache data (based on the notifications received from directory server 160) and accordingly contains the current member list corresponding to each of the dynamic groups.

In step 260, search tool 150 identifies the dynamic groups to which the specific user belongs by examining the content of the retrieved cache data. The identification may be performed by checking whether the specific user is included in the current member lists contained in cache data. The specific user is identified to belong to a dynamic group only if the specific user is included in the member list maintained for the dynamic group.

In one embodiment, when cache data is maintained in data store 180 implemented according to relational database technologies, the retrieval of cache data and the identification of the dynamic groups is performed by executing an appropriate SQL query.

In step 280, search tool 150 sends the determined groups as a response to the request. The response may be sent to the requesting collaborative application (executing in collaboration system 150) or requesting client system 110A-110C (used by the user/administrator) from where the request of determining groups to which a user belongs was received. The flowchart ends in step 299.

Thus, search tool 150 by maintaining and using an updated cache data indicating the current member lists simplifies determination of the groups to which users belongs when using dynamic groups. The manner in which determination of dynamic groups to which a member belongs is implemented in one embodiment is described below with examples.

4. Example Implementation

FIGS. 3A-3B and 4A-4C together illustrate the manner in which determination of groups to be which specific user belongs when using dynamic groups is implemented in one embodiment. Broadly, sample user data at two different time instances is first described (along with an approach to determination of groups to which a member belongs) followed by the description of the cache data and the inventive approach. Each of the Figures is described in detail below.

Figure 3A:
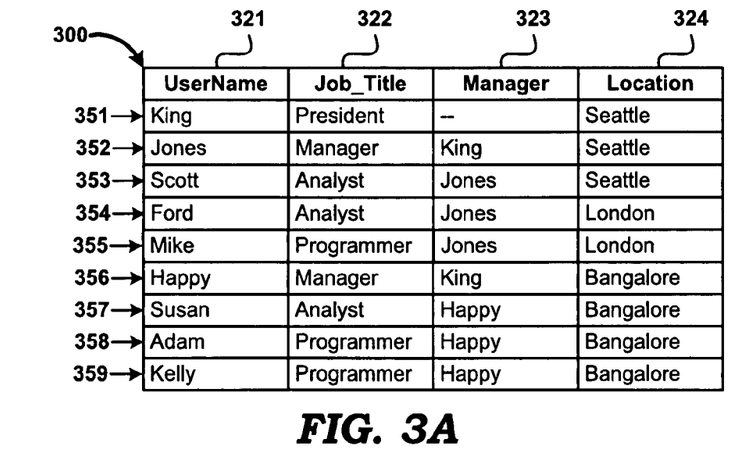
FIGS. 3A and 3B depicts portions of a user data (maintained in a directory server 160) at two different time instances in one embodiment.
Figure 3B:
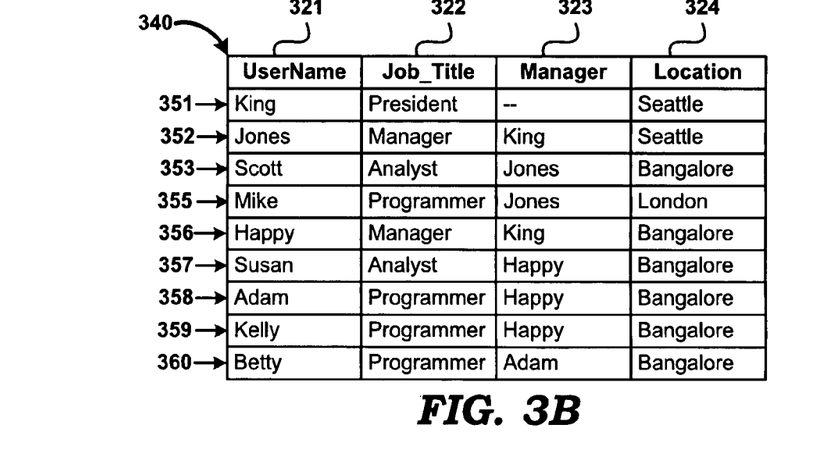

FIGS. 3A and 3B depicts portions of a user data (maintained in a directory server 160) at two different time instances in one embodiment. The user data is shown in a tabular form merely for convenience. Though only sample columns/rows are shown in FIGS. 3A-3B (as well as FIGS. 4A-4C), various other implementations may include other desired columns/rows based on the specific environments.

Table 300 specifies the details of various users in an enterprise at a first time instance. Column 321 "UserName" specifies a unique identifier/name corresponding to each user, column 322 "JobTitle" specifies the designation of each user within the enterprise, column 323 "Manager" specifies the identifier/name of the manager of each user and column 324 "Location" specifies the location of each user. Columns 321-324 represent the attributes of the corresponding user, with the values in the columns representing the attribute values for the corresponding user.

Each of the rows 351-359 specifies the details of corresponding users. In particular, row 351 specifies a user named "King" (column 321) having the designation "President" (column 322) with no manager ('-' in column 323) and working from Seattle (column 324). Row 352 specifies a user named "Jones" having the designation "Manager", with manager "King" (shown in row 351) and working from Seattle. Similarly, rows 353-359 specify details of other corresponding users in the enterprise.

Dynamic groups may be defined with respect to the user data shown in table 300 of FIG. 3A. The dynamic groups and the corresponding rules/criteria are shown below (in a convenient format):

G1 [Manager='Jones']
G2 [Location='Bangalore']
G3 [Job_Title='Analyst']

Wherein G1, G2 and G3 are the names of the dynamic groups and the text within the square brackets represents the corresponding rules/criteria for each of the dynamic groups. Thus, dynamic group G1 is defined to include users/members whose manager (column 323) is 'Jones', G2 includes users whose location (column 324) is 'Bangalore' and G3 includes users whose job title (column 322) is 'Analyst'.

The identifiers of the dynamic groups and the corresponding rules (containing one or more conditions) may be maintained in directory server 160 (along with the user data shown in FIGS. 3A and 3B.

The members of each of dynamic groups (that is, member lists) when determined with respect to the user data shown in table 300 (at a first time instance) are shown below:

G1={"Scott", "Ford", "Mike"}
G2={"Happy", "Susan", "Adam", "Kelly"}
G3={"Scott", "Ford", "Susan"}

Thus, dynamic group G1 is indicated to contain the users "Scott", "Ford" and "Mike" (rows 353-355), while the member list corresponding to dynamic group G2 includes the users "Happy", "Susan", "Adam", "Kelly" (rows 356-359). It may be observed that the same user may belong to multiple groups, for example, "Scott" belongs to both dynamic groups G1 and G3 and "Susan" belongs to both the dynamic groups G2 and G3.

Membership requests to determine the groups to which a specific user belongs may be received in the form "Get_Groups_Of[UserName]", where "UserName" is the unique identifier/name of the specific user sought to be searched for. In one embodiment, such membership requests are directed to directory server 160, with the directory server 160 then determining and sending the groups to which "UserName" belongs as corresponding responses. Some sample membership requests and the corresponding responses generated by directory server 160 are shown below:

Get_Groups_Of['Scott']={G1, G3}
Get_Groups_Of['Susan']={G2, G3}

On receiving the request Get_Groups_Of['Scott'], directory server 160 may first determine the member lists for each of the dynamic groups defined (as shown above) and then check whether the specific member "Scott" is included in the determined member lists to identify the dynamic groups G1 and G3. Similar operations may be performed when the next request Get_Groups_Of['Susan'] is received.

It may be observed that the performance of such an operation would require considerable amount of time and/or resource, in particular, when there are a large number of dynamic groups defined in directory server 160. It should be noted that caching of the member lists determined during the processing of the first request (for "Scott") and subsequently using the cached member lists during the processing of the second request (for "Susan") is generally not feasible, since the user data may be modified between the two request time instances as described below.

Referring to FIG. 3B, table 340 specifies the details of various users in an enterprise at a second time instance (later than the first time instance) corresponding to table 300. Similar numbers are used to represent corresponding portions of FIGS. 3A and 3B and hence only the changed portions are described in detail below.

Row 353 indicates that the value of the location attribute (Column 324) for the user "Scott" has changed to "Bangalore" (from the old value of "Seattle"). Row 360 represents a new user named "Betty", having the job title "Programmer", the user "Adam" as manager and located at "Bangalore", who was added after the first time instance. It may be noted that row 354 (user "Ford") has been deleted before the second time instance.

The members of dynamic groups when evaluated at second time instance with respect to the user data in table 340 are shown below:

G1={"Scott", "Mike"}
G2={"Happy", "Susan", "Adam", "Kelly", "Scott", "Betty"}
G3={"Scott", "Susan"}

Further, on receiving the above requests for determining the groups to which specific users belong, directory server 160 generates the responses shown below:

Get_Groups_Of['Scott']={G1, G2, G3}
Get_Groups_Of['Susan']={G2, G3}

Thus, on receiving the request Get_Groups_Of['Scott'], directory server 160 may again determine the member lists for each of the dynamic groups defined, and check whether the specific user "Scott" is included in the determined member lists to identify the dynamic groups G1, G2 and G3. It may be noted that the change in the membership status of the user "Scott" from one time instance to another may necessitate determination of the member lists for each membership request.

According to an aspect of the present invention, an updated cache data indicating the current member list for each dynamic group is maintained (removing the requirement to determine the member list for each request). The manner in which search tool 150 maintains cache data corresponding to the user data of FIGS. 3A-3B in one embodiment is described in detail below.

5. Cache Data

Figure 4A:
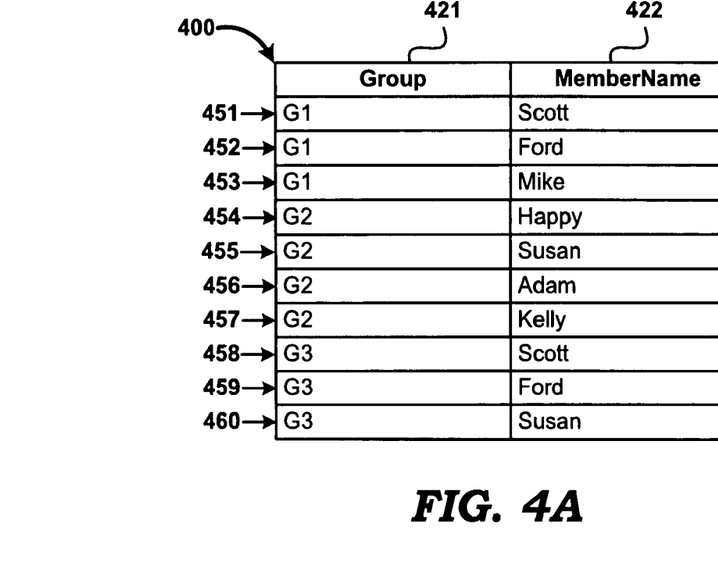
FIGS. 4A and 4B depicts portions of cache data maintained at two different time instances in one embodiment.
Figure 4B:
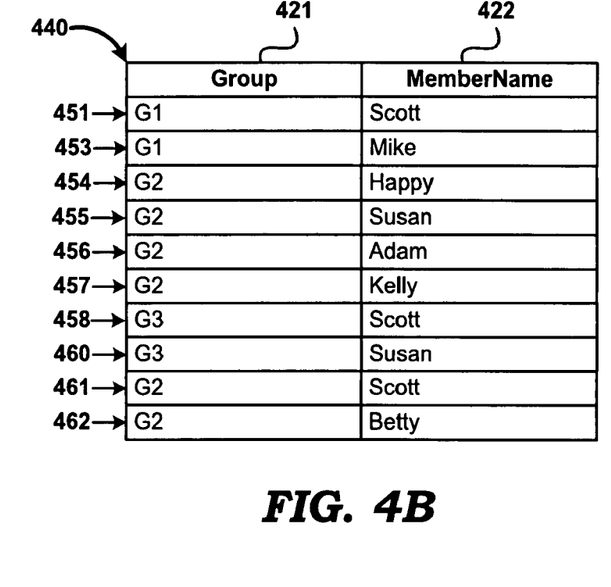

FIGS. 4A and 4B depicts portions of cache data maintained at two different time instances in one embodiment. The description is continued assuming that the cache data is maintained as a table in a database in data store 180 (supporting relational database technologies). However, in other embodiments, the cache data may be maintained as queues, lists or other convenient data structures in a volatile memory and/or files in a secondary storage.

Table 400 represents a portion of cache data indicating members belonging to each of the multiple dynamic groups in an enterprise at a first time instance. Column 421 "Group" specifies the unique identifier/name of a dynamic group, while column 422 "MemberName" specifies the unique identifier/name of the user belonging to the group.

Each of rows 451-460 represents a combination of a dynamic group and a member, indicating that the member belongs to the group. Accordingly, rows 451-453 indicate that Scott, Ford and Mike belong to group G1; rows 454-457 indicate that Happy, Susan, Adam and Kelly belong to group G2 and rows 458-460 indicate that Scott, Ford and Susan belong to group G3.

It may be observed that the data maintained in table 400 corresponds to the member lists determined by directory server 160 with respect to the user data shown in table 300 at a first time instance as described above.

In general, when search tool 150 receives a request to determine the groups to which a specific user belongs in the form "Get_Groups_Of[UserName]", search tool 150 first forms a SQL query designed to retrieve cache data of table 400 and identify the groups to which the specific user "UserName" belongs. The SQL query may be generated as shown below:

SELECT Group
FROM Memberlist
WHERE MemberName='UserName'

Where, "SELECT", "FROM", "WHERE" and "=" are SQL keywords, Group and MemberName respectively indicate columns 421 and 422 and MemberList is the name of table 400 in which cache data is being maintained. UserName is a place holder for the name of the specific user (specified in the received membership request).

Thus, when the request Get_Groups_Of['Scott'] is received, the value of 'Scott' is substituted in place of the place holder "UserName" in the above query and the resultant SQL query is then executed. The execution of the query causes the values G1 and G3 in column 421 for the rows 451 and 458 to be retrieved.

Thus, the groups to which "Scott" belongs is determined to be {G1, G3}, similar to the output generated (by directory server 160) for the first time instance. The cache data of table 400 is kept updated to reflect the modifications made to the user data between two instances as described below.

Referring to FIG. 4B, table 440 specifies the details of various users in an enterprise at a second time instance (later than the first time instance) corresponding to table 400. Similar numbers are used to represent corresponding portions of FIGS. 4A and 4B and hence only the changed portions are described in detail below.

Rows 461 and 462 represent new rows added that respectively indicate that users "Scott" and "Betty" belong to group "G2". Row 461 is added in response to an indication (from directory server 160) that the attribute "Location" of the user "Scott" has been changed to "Bangalore" (from the old value of "Seattle") as shown in row 353. In response to the update indication, search tool 150 may check whether the user "Scott" belong to other dynamic groups and accordingly update cache data to reflect the changes made in the user data.

Row 462 is added in response to receiving an indication (from directory server 160) that the new user named "Betty" has been created/added (as shown in row 360) after the first time instance. It may be noted that row 452 has been deleted before the second time instance in response to an indication that the user "Ford" has been deleted/remove from the user data shown in table 340.

Thus, cache data is kept updated to reflect the modifications made to the user data between the two time instances. It may be observed that the data maintained in table 440 corresponds to the member lists determined by directory server 160 with respect to the user data shown in table 440 at a second time instance as described above.

Accordingly, the execution of the SQL query by search tool 150 corresponding to the request Get_Groups_Of['Scott'] causes the values G1, G2, and G3 in column 421 for rows 451, 458 and 461 to be retrieved. Thus, the groups to which "Scott" belongs is determined to be {G1, G2, G3}, similar to the output generated (by directory server 160) for the second time instance.

Thus, search tool 150 by maintaining cache data indicating the members that belong to each dynamic group, facilitates the determination of the groups to which specific users belong to be performed using corresponding SQL queries. As may be appreciated, the execution of SQL queries in general requires considerably less time and/or resources (in comparison generating the member lists and then checking for the specific user in each of the generated member lists). Accordingly, the determination of the dynamic groups to which a member belongs is simplified.

Accordingly to another aspect of the present invention, a user/administrator is enabled to manually specify that members belonging to a dynamic group. Such a feature may be desirable when a specific user is required to be added (or removed) to/from a dynamic group, even when the attribute values of the specific user does not satisfy (or satisfies) the rule defined for the dynamic group. In one embodiment, search tool 150 maintains an include/exclude list to enable users to manually specify members belonging to dynamic groups as described below with examples.

6. Include/Exclude List

Figure 4C:
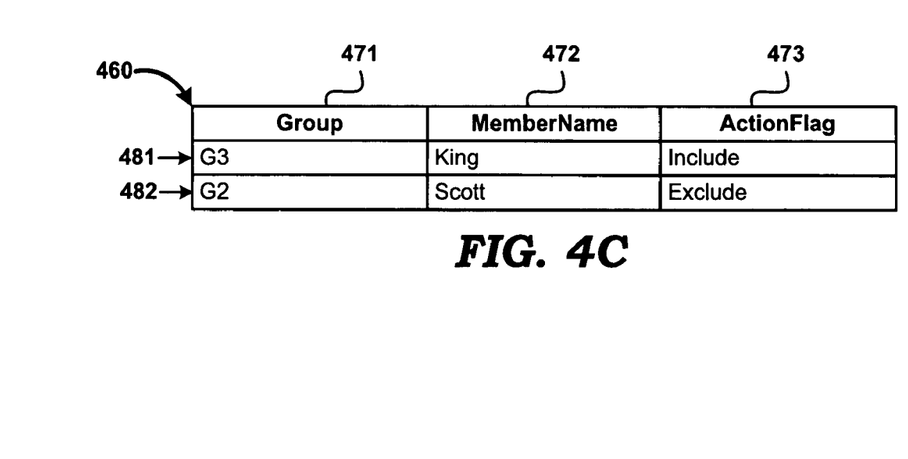
FIG. 4C depicts portions of include/exclude data maintained in a database in one embodiment.

FIG. 4C depicts portions of include/exclude data maintained in a database in one embodiment. However, in other embodiments, the include/exclude list may be maintained as queues, lists or other convenient data structures in a volatile memory or as files in a secondary storage.

Table 460 represents a portion of include/exclude data indicating which members are to be included or excluded from which dynamic groups. Column 471 "Group" specifies the unique identifier/name of a dynamic group, and column 472 "MemberName" specifies the unique identifier/name of a user. Column 473 "ActionFlag" specifies whether the user specified in column 472 is to be included (value "Include") or excluded (value "Exclude") from the group specified in column 471.

Thus, row 481 indicates that the user "King" is to be included in the group "G3", while row 482 indicates that the user "Scott" is to be excluded from the group "G2". It may be observed that the user "King" is indicated to be included in the group "G3" even though the location value "Seattle" of the user "King" does not satisfy the rule "Location='Bangalore'" corresponding to group "G3". Similarly, the user "Scott" is indicated to be excluded from the group "G2" even though the attribute value "Analyst" for the attribute "Job_Title" satisfies the rule corresponding to group "G2".

Similarly, a user/administrator may manually specify the users/members to be included/excluded from each of the dynamic groups (defined in directory server 160 and whose member lists are maintained in cache data as described above).

Search tool 150 is designed to inspect the data maintained in the include/exclude list and to perform appropriate actions. For example, when a request such as Get_Groups_Of ['Scott'] is received with respect to the cache data of table 440, search tool 150 first generates and executes a corresponding SQL query to determine the groups as {G1, G2, G3}. Search tool 150 then checks the include/exclude list of table 460, and removes G2 from the determined result as indicated by row 482. Thus, search tool 150 determines the dynamic groups to which "Scott" belongs as being {G1, G3}.

A similar operation may be performed when search tool 150 is requested to identify the members belonging to the group "G2". As such search tool 150 may determine that the users {"Happy", "Susan", "Adam", "Kelly", "Betty"} belong to the group "G2" at the second time instance (data of table 340). It may be noted that the user "Scott" is not included in the member list corresponding to the group "G2" in accordance with the manual exclusion specified in row 482 of table 460.

While table 460 is described as being used after execution of the SQL query in determining the groups to which a member belongs, it should be appreciated that in alternative embodiments, the SQL query itself (shown above) may be modified to provide the combined results of examining the cache data and inspecting the include/exclude list, as will be apparent to one skilled in the relevant arts by reading the disclosure provided herein.

It should be further appreciated that the above-described features may be implemented in a combination of one or more of hardware, software and firmware. The description is continued with respect to an embodiment in which various features are operative by execution of corresponding software instructions.

7. Digital Processing System

Figure 5:
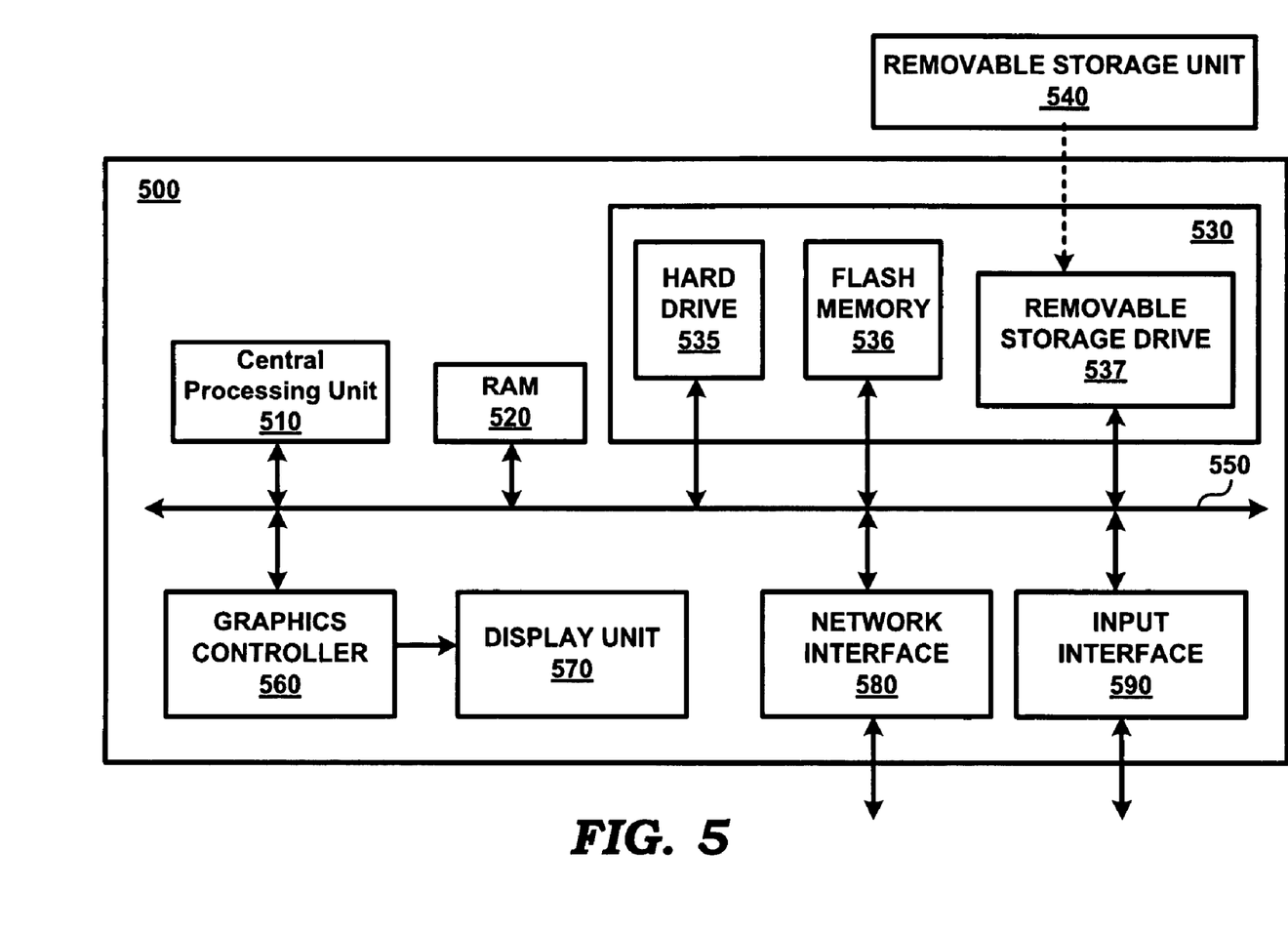
FIG. 5 is a block diagram illustrating the details of a digital processing system in which various aspects of the present invention are operative by execution of appropriate executable modules.

FIG. 5 is a block diagram illustrating the details of digital processing system 500 in which various aspects of the present invention are operative by execution of appropriate software instructions. Digital processing system 500 may correspond to collaboration system 170 (or to any other system such as directory server 160) implementing search tool 150.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs.

Network interface 580 provides connectivity to a network (e.g., using Internet Protocol), and may be used to communicate with other connected systems (such as client systems 110A-110B, directory server 160, server system 190) of FIG. 1.

Secondary memory 530 may contain hard drive 535, flash memory 536, and removable storage drive 537. Secondary memory 530 may store the data (e.g., the user data of FIGS. 3A-3B, the cache data of FIGS. 4A-4B, the inclusion/exclusion data of FIG. 4C) and software instructions (e.g., those implementing the flowcharts and other features described above), which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way

What is claimed is:

1. A computing system comprising:
    an identity management server to process membership requests related to a plurality of dynamic groups based on a user data and a plurality of rules;
    a collaboration system to execute an application requiring a set of dynamic groups to which a user belongs, wherein said set of dynamic groups is contained in said plurality of dynamic groups; and
    a search tool operable to:
        receive a plurality of rules and a user data, said user data containing a set of attributes and corresponding values related to each of a plurality of users, each of said plurality of rules specifying a corresponding criteria to be used to include each user as a member of a corresponding dynamic group,
        said criteria specifying at least one attribute and a corresponding condition with respect to the condition to be satisfied for a user to be included in the corresponding dynamic group;
        maintain a cache data indicating which of a plurality of users are members of which of said plurality of dynamic groups, wherein the members of each group are determined by checking whether the value of an attribute for the corresponding user in said user data satisfies the condition contained in the criteria for being included in the corresponding dynamic group;
        receive a membership request from said application, said membership request requesting said set of dynamic groups to which said user belongs,
        said membership request including an identifier of said user to indicate that the set of dynamic groups to which said user belongs, is being requested;
        examine said cache data to determine said set of dynamic groups to which said user belongs; and
        send a response to said application indicating that said user belongs to said set of dynamic groups,
        wherein said cache data is maintained before said search tool receives said membership request.

2. The computing system of claim 1, wherein said search tool maintains said cache data as tables in a database server, to perform said examine, said search tool being operable to form and execute a structured query language (SQL) query on said database server to determine said set of dynamic groups to which said user belongs.

3. The computing system of claim 2, wherein said cache data is stored in a table containing respective columns for the identifier of a dynamic group and the identifier of a user, wherein each row of said table indicates the dynamic group to which the user belongs,
    wherein said SQL query is of the form
        SELECT Group
        FROM MemberList
        WHERE MemberName='UserName'
    wherein Group and MemberName are names of said respective columns, MemberList is the name of said table, and UserName is a place holder for the identifier of said user.

4. The computing system of claim 1, said search tool is further operable to:
    store an include list and an exclude list, respectively indicating a corresponding set of users to be included and excluded for each dynamic group; and
    inspect said include list and said exclude list to determine whether any dynamic groups are to be respectively included in and excluded from said set of dynamic groups for said user.

5. The computing system of claim 4, wherein said search tool performs said inspect after said examine.

6. The computing system of claim 4, wherein said examine and said inspect are performed using a single SQL query.

7. The computing system of claim 1, wherein to perform said maintain, said search tool is operable to:
    receive a notification from said identity management server upon any change to said user data or said plurality of rules; and
    update said cache data according to the change indicated in said notification,
    wherein said update is also performed prior to receiving membership requests such that each membership request is processed based on the cache data maintained prior to receiving of the corresponding membership request.

8. The computing system of claim 7, wherein said search tool is provided within said identity management server.

9. The computing system of claim 1, wherein said search tool receives said user data and said plurality of rules from a directory server, whereby said user data and said plurality of rules are present as respective data prior to said receive and said maintain.

10. A method of determining dynamic groups to which users belong, said method comprising:
    receiving a plurality of rules and a user data, said user data containing a set of attributes and corresponding values related to each of a plurality of users, each of said plurality of rules specifying a corresponding criteria to be used to include each user as a member of a corresponding dynamic group,
    said criteria specifying at least one attribute and a corresponding condition with respect to the condition to be satisfied for a user to be included in the corresponding dynamic group;
    maintaining a cache data indicating which of a plurality of users are members of which of a plurality of dynamic groups, wherein the members of each group are determined by checking whether the value of an attribute for the corresponding user in said user data satisfies the condition contained in the criteria for being included in the corresponding dynamic group;
    receiving a membership request requesting a set of dynamic groups to which a user belongs,
    said membership request including an identifier of said user to indicate that the set of dynamic groups to which said user belongs, is being requested;
    examining said cache data to determine said set of dynamic groups to which said user belongs; and
    sending a response to said membership request indicating that said user belongs to said set of dynamic groups,
    wherein said maintaining is performed prior to receiving said membership request.

11. The method of claim 10, wherein said maintaining maintains said cache data as tables in a database server, wherein said examining comprises forming and executing an structured query language (SQL) query on said database server to determine said set of dynamic groups to which said user belongs.

12. The method of claim 10, further comprising:

storing an include list and an exclude list, respectively indicating a corresponding set of users to be included and excluded for each dynamic group; and inspecting said include list and said exclude list to determine whether any dynamic groups are to be respectively included in and excluded from said set of dynamic groups for said user.

13. The method of claim 12 wherein said examining and said inspecting are performed using a single SQL query.

14. The method of claim 10, wherein said maintaining is performed in a search tool external to said identity management server, said maintaining further comprising:

receiving a notification from said identity management server upon any change to said user data or said plurality of rules; and updating said cache data in said search tool according to the change indicated in said notification, wherein said update is also performed prior to receiving membership requests such that each membership request is processed based on the cache data maintained prior to receiving of the corresponding membership request.

15. The method of claim 10, wherein said search tool receives said user data and said plurality of rules from a directory server, whereby said user data and said plurality of rules are present as respective data prior to said receive and said maintain.

16. A machine readable medium carrying one or more sequences of instructions for causing a system to determine dynamic groups to which users belong, wherein execution of said one or more sequences of instructions by one or more processors contained in said system causes said system to perform the actions of:

receiving a plurality of rules and a user data, said user data containing a set of attributes and corresponding values related to each of a plurality of users, each of said plurality of rules specifying a corresponding criteria to be used to include each user as a member of a corresponding dynamic group, said criteria specifying at least one attribute and a corresponding condition with respect to the condition to be satisfied for a user to be included in the corresponding dynamic group;

maintaining a cache data indicating which of a plurality of users are members of which of a plurality of dynamic groups, wherein the members of each group are determined by checking whether the value of an attribute for the corresponding user in said user data satisfies the condition contained in the criteria for being included in the corresponding dynamic group;

receiving a membership request requesting a set of dynamic groups to which a user belongs, said membership request including an identifier of said user to indicate that the set of dynamic groups to which said user belongs, is being requested;

examining said cache data to determine said set of dynamic groups to which said user belongs; and sending a response to said membership request indicating that said user belongs to said set of dynamic groups, wherein said maintaining is performed prior to receiving said membership request.

17. The machine readable medium of claim 16, wherein said maintaining maintains said cache data as tables in a database server, wherein said examining comprises one or more instructions for forming and executing an structured query language (SQL) query on said database server to determine said set of dynamic groups to which said user belongs.

18. The machine readable medium of claim 17, further comprising one or more instructions for:

storing an include list and an exclude list, respectively indicating a corresponding set of users to be included and excluded for each dynamic group; and inspecting said include list and said exclude list to determine whether any dynamic groups are to be respectively included in and excluded from said set of dynamic groups for said user.

19. The machine readable medium of claim 18, further comprising one or more instructions for:

storing a user data and a plurality of rules in a identity management server, wherein said user data contains attributes and corresponding values related to a plurality of users and each of said plurality of rules specifies a criteria to be used to include each user as a member of a corresponding dynamic group;

receiveing a second membership request in said identity management server, said second membership request requesting groups to which a second user belongs;

determining a corresponding list of members for each of said plurality of dynamic groups using said user data and the corresponding rule;

checking which of said lists of members includes said second user to identify a second set of dynamic groups to which said second user belongs; and sending a second response indicating that said second user belongs to said second set of dynamic groups.

20. The machine readable medium of claim 19, wherein said system is external to said identity management server, said maintaining further comprising one or more instructions for:

receiving a notification from said identity management server upon any change to said user data or said plurality of rules; and updating said cache data in said system according to the change indicated in said notification.

21. The machine readable medium of claim 16, wherein said search tool receives said user data and said plurality of rules from a directory server, whereby said user data and said plurality of rules are present as respective data prior to said receive and said maintain.

* * * * *

UNITED STATES PATENT AND TRADEMARK OFFICE
CERTIFICATE OF CORRECTION

PATENT NO.         : 8,150,876 B2
APPLICATION NO.    : 12/369732
DATED              : April 3, 2012
INVENTOR(S)        : Krishna It is certified that error appears in the above-identified patent and that said Letters Patent is hereby corrected as shown below:

On front page, in column 2, under "Other Publications", line 11, delete "wasinfo/index" and insert -- wasinfo/v6r0/index --, therefor.

In column 9, line 31, delete "Memberlist" and insert -- MemberList --, therefor.

In column 13, line 14, delete "way" and insert -- way. --, therefor.

In column 16, line 34, in Claim 19, delete "receiveing" and insert -- receiving --, therefor.

Signed and Sealed this
Twenty-fourth Day of July, 2012

David J. Kappos
*Director of the United States Patent and Trademark Office*